Nov. 28, 1961

H. J. BACH 3,010,846

PRIMER COMPOSITIONS

Filed Nov. 2, 1959

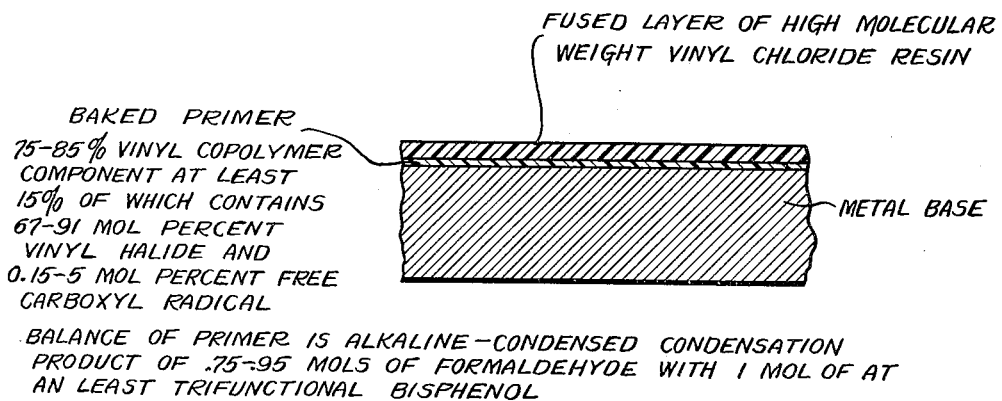

FUSED LAYER OF HIGH MOLECULAR WEIGHT VINYL CHLORIDE RESIN

BAKED PRIMER
75-85% VINYL COPOLYMER
COMPONENT AT LEAST
15% OF WHICH CONTAINS
67-91 MOL PERCENT
VINYL HALIDE AND
0.15-5 MOL PERCENT FREE
CARBOXYL RADICAL

METAL BASE

BALANCE OF PRIMER IS ALKALINE-CONDENSED CONDENSATION PRODUCT OF .75-.95 MOLS OF FORMALDEHYDE WITH 1 MOL OF AT AN LEAST TRIFUNCTIONAL BISPHENOL

INVENTOR.
Henry J. Bach
BY
Schneider, Dressler, Goldsmith & Clement
ATTORNEYS

United States Patent Office 3,010,846
Patented Nov. 28, 1961

3,010,846
PRIMER COMPOSITIONS
Henry J. Bach, Mount Lebanon Township, Allegheny County, Pa., assignor to American-Marietta Company, Stoner-Mudge Co. Division, Chicago, Ill., a corporation of Illinois
Filed Nov. 2, 1959, Ser. No. 850,083
20 Claims. (Cl. 117—75)

The present invention relates to primer compositions particularly adapted to enable vinyl dispersion topcoats to be adhered to a base, especially to a metal surface such as iron or steel, tin or aluminum and is a continuation-in-part of my prior application Serial No. 607,260 filed August 21, 1956, now Patent No. 2,946,702, the disclosure of which is hereby incorporated.

My prior application relates primarily to polyvinyl resin dispersions which may be applied to a base in a thick layer and thereafter fused by baking at temperatures of 400° F. or more, without developing film blisters or the like. The primer compositions of the invention are particularly adapted to secure adhesion of the polyvinyl resin dispersions of my prior application to various metal surfaces including aluminum surfaces to which polyvinyl resin dispersions are particularly difficult to adhere. Additionally, the primer compositions of the invention are generally useful in adhering vinyl resin plastisols and organosols to a metal base such as iron, steel or aluminum. The iron or steel surface may be treated with acid, e.g., phosphoric acid, or galvanized. The aluminum surface may be provided with an amorphous phosphate or chromate surface, adhesion to such treated aluminum surface constituting a feature of the invention.

The metal base is desirable in the form of a sheet but members of any form may be used, e.g., bars, rods, pipes, printing roll cores, tubes, etc.

The invention is diagrammatically illustrated in the accompanying drawing in which legends are used to briefly identify the layers involved.

The primer compositions of the invention comprise a resin mixture dissolved in a liquid organic solvent. From about 75 to about 85% by weight of the resin mixture consists essentially of a vinyl copolymer component comprising vinyl halide and a polymerizable mono-olefinically unsaturated monomer in which the sole reactive entity in the monomer is the olefinic unsaturation thereof. These monomers are illustrated by vinyl fatty acid esters or other unsaturated esters such as dibutyl maleate or fumarate or vinylidene halides such as vinylidene chloride or other olefinically unsaturated monomers which are copolymerizable with vinyl chloride. All or a portion of the vinyl copolymer component includes in the copolymer a carboxylic monomer providing from about 0.15 mol percent to about 5.0 mol percent of free carboxyl radical in the vinyl copolymer component, preferably from 0.2–0.7 mol percent. The balance of the resin mixture is an alkaline condensed condensation product of from .75 to .95 mol of formaldehyde with 1 mol of an at least trifunctional bisphenol.

The carboxylic monomer is selected from the group consisting of aliphatic alpha, beta-monoethylenically unsaturated carboxylic acids, carboxylic acid anhydrides and partial alkyl esters of said acids. The preferred carboxylic monomer is maleic acid. However, maleic anhydride, acrylic acid, methacrylic acid, crotonic acid, monobutyl maleate and monopropyl itaconate are representative of other unsaturated carboxylic monomers which can be used to provide free carboxylic acid groups in the copolymers which are formed. The acid anhydride group is here considered to be the equivalent of a pair of carboxylic acid groups.

The carboxyl-containing vinyl copolymer should have a molecular weight in the range of about 6000 to about 20,000 and contain from about 67 to about 91 mol percent of vinyl halide.

The preferred vinyl halide is vinyl chloride which is the commercially representative species.

The commercially representative and most preferred vinyl fatty acid ester is vinyl acetate although the esters of other lower aliphatic acids such as vinyl propionate and vinyl butyrate are also preferred among the fatty acid esters.

A particularly preferred carboxyl-containing vinyl copolymer for use in accordance with the invention is a copolymer of 86 parts by weight of vinyl chloride, 13 parts by weight of vinyl acetate and 1 part by weight of maleic acid and having a molecular weight of about 15,000, this copolymer being referred to as carboxyl-containing vinyl copolymer A.

Up to about 85% of the vinyl copolymer component is desirably constituted by a copolymer of vinyl halide and an olefinically unsaturated monomer copolymerizable therewith, preferably, a vinyl fatty acid ester. The copolymer should have a molecular weight above 20,000 and contain from 92–97 mol percent of vinyl halide with the balance of the copolymer being the olefinically unsaturated monomer, preferably a vinyl fatty acid ester of the type described in connection with the carboxyl-containing vinyl copolymer. This higher molecular weight vinyl copolymer is preferably illustrated by a copolymer containing 90 weight percent of vinyl chloride and 10 weight percent of vinyl acetate and which is hereinafter referred to as vinyl copolymer A.

Preferably, the vinyl copolymer component of the resin mixture contains at least 10% and more preferably at least 20% of the higher molecular weight, high vinyl chloride content copolymer with the balance of the vinyl copolymer component being constituted by the lower molecular weight and lower vinyl chloride content carboxyl-containing copolymer or mixture of copolymers.

The presence of the higher molecular weight, high vinyl chloride content copolymer provides important benefit when the vinyl plastisol topcoat is baked upon the primer at temperatures of 400° F. and higher, and is desirably included even when lower baking temperatures are used, particularly since improved resistance to boiling water is obtained thereby.

In the mixture of vinyl copolymers, it is desirable that a sufficient proportion thereof contain free carboxyl groups to provide at least 15 weight percent of carboxyl-containing copolymer in the vinyl copolymer component while still providing the desired mol percentage of free carboxyl radical as previously stated.

Referring more particularly to the bisphenol-formaldehyde condensation product, by the term a bisphenol is meant a compound or mixture of compounds in which two phenolic groups are bound together by means of a divalent aliphatic saturated hydrocarbon radical. The compound thus contains two phenolic hydroxyl groups, each of which is positioned on a separate aromatic nucleus separated by an intervening aliphatic hydrocarbon radical. The preferred bisphenol is bisphenol A (p,p' dihydroxy diphenyl propane 2,2), which is tetrafunctional, such functionality being preferred. To provide desired thermosetting characteristics, the bisphenol should be at least trifunctional. An illustrative trifunctional bisphenol is the reaction product of 1 mol of phenol, 1 mol of o-cresol and 1 mol of acetone which yields p,p' dihydroxy m-methyl diphenyl 2,2' propane.

When the formaldehyde content of the condensation products of the invention exceeds 0.95 mol of formaldehyde per mol of bisphenol, the resin becomes too viscous to dehydrate, and it cannot be used. On the other hand, when the proportion of formaldehyde is less than .75 mol per mol of bisphenol, the primers of the invention lose their ability to withstand fabrication and to resist water in both liquid and vapor forms at elevated temperature.

The condensation reaction between formaldehyde and the bisphenol is preferably effected, in accordance with the invention, in water solution. The results obtained in organic solvent medium are not fully comparable to those obtained in water because the condensates obtained in solution are deficient in their ability to withstand fabrication.

In effecting the water solution condensation reaction in accordance with the invention, sufficient water is used to provide a workable or stirrable mass. The minimum proportion of water is conveniently supplied through the use of formaldehyde in the form of a 37% aqueous solution. While an excess of water may be present, it is economically desirable to employ the minimum water consistent with stirrability of the solution.

The condensation reaction is effected in the presence of an alkaline catalyst. Various alkaline catalysts may be used such as caustic soda, sodium carbonate, triethanolamine, morpholine or similar base. Ammonia is particularly outstanding in providing a condensation product free of soluble salts which is particularly adapted to provide a preferred component of the primer compositions of the invention. The ammonia is desirably introduced into the reaction mixture as a concentrated aqueous solution, e.g., a 28% solution of ammonia in water.

The proportion of alkaline condensation catalyst should be sufficient to overcome the acidity conferred by the presence of formaldehyde. Excess alkaline catalyst is wasteful and increases the proportion of salt by-products. Thus, large excesses of alkaline catalyst, while operative, are desirably avoided. About 10% by weight of 28% ammonia based on the weight of the bisphenol is desirably employed for optimum results.

The reaction is carried out by heating the reaction mixture until an exothermic reaction takes place and this reaction is continued until the exotherm subsides. The reaction may be carried out under reflux conditions at normal atmospheric pressure, the vapors formed being condensed and returned to the reaction mixture. Sufficient water should be present or added to permit continuous agitation.

A preferred bisphenol-formaldehyde condensation product may be provided in the following manner. 71.0 parts of bisphenol A are mixed in a reaction vessel with 21.9 parts of a 37% water solution of formaldehyde and 7.1 parts of a 28% solution of ammonia in water. This mixture is then heated with continuous agitation to a temperature of 60° C. and the reaction mixture is maintained at this temperature for 75 minutes. The mixture is then cooled and the water layer decanted. The resin layer is then dehydrated under vacuum while heating to facilitate removal of water. During dehydration the temperature should not exceed 85° C. Dehydration is continued until the resin has a cure time of 60–70 seconds at 365° F. When this cure time is reached the resin product is discharged and allowed to cool. The above described bisphenol-formaldehyde condensation product is hereinafter referred to as condensation product A.

Any of the conventional vinyl plastisols and organosols, using vinyl chloride homopolymers or copolymers of vinyl chloride with minor proportions of vinyl acetate or vinylidene chloride may be utilized in the present invention. The invention is particularly directed to plastisols containing polymers and copolymers comprising at least 90% by weight of vinyl chloride and of molecular weight above 20,000 so as to possess only limited solubility in organic solvents. Thus, polyvinyl chloride per se may be employed as well as copolymers comprising vinyl chloride with a minor proportion of about 10% or less of vinyl acetate or vinylidene chloride.

Exemplary vinyl resins for use in plastisols and organosols for the formulation of topcoats in accordance with the present invention are those sold under the trade designations Geon 121, Opalon 410 and Vinylite QYNV. Reference is made to the B. F. Goodrich Chemical Company Service Bulletin No. PR–3 dated June 1954 which contains examples of dispersions and their use.

As is conventional, the plastisols and organosols may be pigmented and may include fillers as well as various plasticizers and stabilizers without detracting from the superior adhesion which is achieved utilizing the primers of the present invention. Suitable weight ratios of dispersion resin to plasticizer are from 30/70 to 72/28. In oragnosols a higher ratio of dispersion resin to plasticizer up to about 95/5 may be used.

The primers of the present invention are applied to the base from solvent solution medium. Preferred solvents are active solvents such as aliphatic ketones illustrated by methyl ethyl ketone, cycloaliphatic ketones such as cyclohexanone and other active solvents for vinyl resins such as dimethyl formamide. Other active solvents which may be employed are methyl isobutyl ketone, diacetone alcohol, 2-methoxy ethanol or any of the alkyl Cellosolves such as methyl and ethyl Cellosolve. The solvent medium may include a proportion of liquid mononuclear aromatic hydrocarbon solvent such as benzene, toluene and the various xylenes.

The proportion of solvent may be varied to suit the manner in which the solutions of the invention are to be applied, i.e., by brushing, spraying, dipping, roll coating, etc.

The invention is illustrated in the examples which follow in which all parts are by weight.

EXAMPLE I 40 parts of vinyl copolymer A, 40 parts of carboxyl-containing vinyl copolymer A and 20 parts of condensation product A were mixed together and 20 parts of this mixture were dissolved in a solvent system containing 56 parts of xylene and 24 parts of isophorone.

EXAMPLE II 17 parts of a copolymer of 70 weight percent vinyl bromide, 29.3% vinyl propionate, 0.7% maleic anhydride and 3 parts of condensation product A were dissolved in a solvent system containing 20 parts of cyclohexanone, 20 parts of acetone and 40 parts of methyl isobutyl ketone.

Each of the primers set forth in Examples I and II when applied to a metal surface and baked at a temperature of about 300° F. to about 400° F. for a time sufficient to expel the solvent, usually about 5 to 30 minutes, and to provide a coating weight of about 1.5 mg./sq. in. provided an effective primer for adhering vinyl plastisols and organosols.

The advantage achieved by the invention is illustrated in Table I which follows:

Table I

|  | Parts By Weight | | | | |
|---|---|---|---|---|---|
| Carboxyl-containing copolymer A | 80 | 80 | 60 | 40 | 20 |
| Vinyl copolymer A |  |  | 20 | 40 | 60 |
| O-cresol/formaldehyde (1/1.16 mol ratio) | 20 |  |  |  |  |
| Condensation product A |  | 20 | 20 | 20 | 20 |

NOTE.—Primer applied to pail stock and killed steel and baked 10 minutes at 390° F. to provide 1.5 mg./sq. in.
Topcoat A (vinyl chloride plastisol in a thickness of 20 mils and baked 4 minutes at 365° F.)

| | | | | | |
|---|---|---|---|---|---|
| Adhesion | F | G | VG | VG | VG |
| Boiling water resistance | P | P | G | VG | G |

Topcoat B (dispersion Example A, Serial No. 607,260 in a thickness of 20 mils and baked 10 minutes at 425° F.)

| | | | | | |
|---|---|---|---|---|---|
| Adhesion | F | ------ | E | E | G |
| Boiling water resistance | P | ------ | G | E | VG |

In the above Table I, P=Poor, F=Fair, G=Good, VG=Very Good and E=Excellent.

As previously indicated, the adhesion achieved by the primers of the invention with respect to aluminum, both treated and untreated, is an important feature of the invention and this is illustrated by the following data:

On untreated aluminum and using a primer containing 80 parts of carboxyl-containing copolymer A mixed with 20 parts of o-cresol/formaldehyde condensation product at a 1/1.16 mol ratio, baked for ten minutes at 375° F. to provide a coating weight of 1 mg./sq. in. and then topcoated with polyvinyl chloride plastisol to provide a thickness of 30 mils after baking 4 minutes at 365° F., the adhesion to the aluminum substrate was only fair. Using a heavier primer coating weight of 3 mg./sq. in., adhesion was good. However, substituting the primer of Example I of the present application, adhesion was excellent irrespective of whether the primer coating weight was 1 or 3 mg./sq. in. Substantially identical improved results are achieved when the aluminum substrate is pretreated with an amorphous phosphate or chromate coating prior to application of the primer.

Referring more particularly to the dispersions disclosed in my prior application, the essential components of the dispersion are a film-forming polyvinyl resin component, a non-volatile primary plasticizer component for swelling and fusing the resin, and a volatile liquid dispersant component which lowers the viscosity of the dispersion for purposes of application, and assists in fusing the resin component at fusing temperatures.

The resin component of the dispersion is a thermoplastic polyvinyl resin having an average molecular weight in excess of 20,000 (usually not over about 50,000, but extending to higher ranges of 100,000, for example, or more, without any upper limit as regards operability for the purposes of this invention), and made from vinyl chloride in major amount (more than half of the total constituents of the resin), or a mixture of such resins. Such resins are well known in the art, and include the solid thermoplastic polymers and copolymers derived from vinyl chloride, alone, or conjointly with vinylidene chloride, or an ester of vinyl alcohol (e.g., vinyl acetate). The present preferred example of the resin component of the dispersion of the invention is polyvinyl chloride, e.g., "Geon 121" of B. F. Goodrich Chemical Co., Cleveland, Ohio, a polyvinyl chloride resin having a specific gravity of about 1.41 and a specific viscosity of about 0.40 (0.4% solution in nitrobenzene at 20° C.).

The plasticizer component of the dispersion may be any one or a mixture of a wide variety of chemical plasticizers commonly used for plasticizing the polyvinyl resin component described above; e.g., the alkyl and aryl derivatives of organic acids, such as phthalates, pelargonates, glycolates, sebacates, adipates, azelates, phosphates and certain plasticizing petroleum oil fractions. The present preferred example of the plasticizer component is dioctyl phthalate, but it is not critical.

The volatile liquid dispersant component of the dispersion is composed of mixed aromatic alkyl substituted polynuclear hydrocarbons, having a specific gravity of about one, a mixed aniline point of about 26° to about 30° C., a distillation range (ASTM D86–52T) of about 150° C. to about 450° C., and characterized by ability to aid the plasticizer component in dispersing the resin component, and by ability to evaporate most (preferably about 95%) of its weight out of films of the composition of the invention when baked, for example, for a period of about 5 minutes at 425° F. In order for such volatilization to take place in an even progression, thus avoiding blistering, it is necessary for the volatile liquid dispersant to have substantially evenly increasing percentages by weight which have evenly increasing boiling points within the boiling range of the volatile liquid dispersant. The present preferred example of the dispersant component of the invention is a hydrocarbon mixture of the kind described, of coal tar origin, known as "DiPolymer Oil" of Pennsylvania Industrial Chemical Corporation, Clairton, Pennsylvania. It and other examples of the volatile liquid dispersant component which are hydrocarbon mixtures of the kind described, of coal tar origin, have the following characteristics based on typical analyses (Example A being the said "DiPolymer Oil"):

*Table II—Volatile liquid dispersant examples*

| (1) Distillation range | (b) Temperature (° C.) | | | |
|---|---|---|---|---|
| | Ex. A | Ex. B | Ex. C | Ex. D |
| (a) Percent by weight boiling at stated temperature: | | | | |
| 0 | 205 | 150 | 200 | 156 |
| 5 | 237 | 182 | 241 | 187 |
| 10 | 253 | 198 | 258 | 208 |
| 20 | 265 | 210 | 275 | 231 |
| 30 | 277 | 222 | 292 | 253 |
| 40 | 284 | 229 | 304 | 270 |
| 50 | 295 | 240 | 320 | 291 |
| 60 | 307 | 252 | 337 | 313 |
| 70 | 323 | 268 | 358 | 339 |
| 80 | 344 | 289 | 384 | 368 |
| 90 | 368 | 313 | 413 | 404 |
| 95 | 396 | 341 | 441 | 435 |
| Dry | 398 | 344 | 450 | 443 |
| (2) Specific gravity at 15.5° C | 0.99 | .98 | 1.00 | .99 |
| (3) Mixed aniline point | 28 | 26 | 27 | 30 |

The amount of the primary plasticizer component must be in the range of about 2% to about 25% of the combined weight of said primary plasticizer component and the resin component, such range limits being necessary to obtain films having the quality sought. The volatile liquid dispersant component must be present in amount sufficient to make the dispersion fluid, which amount can be in the range of about 5% to about 70%, and preferably is in the range of about 35% to about 55%, of the combined weight of all three components in the composition. The combination of these ranges produces a viscosity from about 30 seconds to about 300 seconds in No. 4 Ford cup at 80° F., which is sufficient to permit application by the various conventional coating methods, such as spraying, roller coating, dipping and brushing. The thickness of the fused coated film which may be deposited in a single application may be varied by adjusting the viscosity of the composition, by adjusting the proportions of the plasticizer or volatile liquid dispersant component, or both, and coating thicknesses can thus be obtained ranging from less than 1 mil to more than 20 mils. Such coatings are notably strong, hard and unblistered, and essentially free of the volatile liquid dispersant component, after being sufficiently baked; e.g., for 5 minutes at 425° F. The baking temperature should be at least about 400° F., but can be increased virtually without limit by suitable control of the baking time. The baking time can be reduced in the case of the thinner coatings, and can be reduced as the baking temperature is increased. Even the thickest of the above-mentioned films are free of blisters, pits, film cracking and similar film imperfections of the kind caused by conventional volatile diluents.

The following table III illustrates examples of compositions of the invention, and their properties when applied and baked on specimens of primed blackplate:

*Table III*

| | Example A | Example B |
|---|---|---|
| (1) Parts by weight of components: | | |
| (a) Resin ("Geon 121") | 44.7 | 51.7 |
| (b) Plasticizer (dioctyl phthalate) | 9.1 | 5.70 |
| (c) Volatile liquid dispersant ("DiPolymer Oil") | 46.2 | 42.6 |
| (2) Viscosity in seconds in #4 Ford Cup at 80° F | 110 | 190 |
| (3) Film properties after coating on primed steel and baking 10 minutes at 425° F. (20 mil film): | | |
| (a) Hardness (Shore A Durometer) | 95 | 98 |
| (b) Cracking | None | None |
| (c) Blistering | None | None |

The primers of the invention may be pigmented or dyed and other material added for decorative purposes and the like and thermal stabilizers and other protective agents may be added without significantly altering the improved adhesion achieved by the invention. Pigmentation of the primers, as with titanium dioxide in a pigment/binder ratio of 0.5/1 to 1/1, tends to improve the boiling water resistance of the primers of the invention.

The invention is defined in the claims which follow.

I claim:

1. A primer comprising a resin mixture dissolved in a liquid organic solvent, said resin mixture consisting essentially of from 75–85% by weight of a vinyl copolymer component, at least 15% by weight based on the weight of said vinyl copolymer component being constituted by a copolymer of 67–91 mol percent vinyl halide, a carboxylic monomer selected from the group consisting of aliphatic α-β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being mono-olefinically unsaturated monomer copolymerizable with vinyl halide and in which the sole reactive entity is the olefinic unsaturation thereof and said carboxyl-containing copolymer having a molecular weight in the range of from 6,000 to 20,000, any balance of said vinyl copolymer component being a copolymer having a molecular weight above 20,000 and constituted by from 92–97 mol percent vinyl halide with the balance of the monomers constituting said last-named copolymer being said mono-olefinically unsaturated monomer, the balance of said resin mixture being an alkaline-condensed condensation product of from .75–.95 mol of formaldehyde with 1 mol of an at least trifunctional bisphenol.

2. A primer as recited in claim 1 in which said condensation product of said bisphenol and formaldehyde is condensed in aqueous medium.

3. A primer as recited in claim 2 in which said condensation of said bisphenol with formaldehyde is effected in the presence of ammonia.

4. A primer as recited in claim 1 in which said vinyl copolymer component contains at least 10% by weight based on the weight thereof of said vinyl copolymer having a molecular weight above 20,000.

5. A primer as recited in claim 1 in which said carboxylic monomer is maleic acid.

6. A primer comprising a resin mixture dissolved in a liquid organic solvent, said resin mixture consisting essentially of from 75–85% by weight of a vinyl copolymer component, from 15% to 90% by weight based on the weight of said vinyl copolymer component being constituted by a copolymer of 67–91 mol percent vinyl chloride, a carboxylic monomer selected from the group consisting of aliphatic α-β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being vinyl ester of a fatty acid containing from 1–4 carbon atoms and said carboxyl-containing copolymer having a molecular weight in the range of from 6,000 to 20,000, the balance of said vinyl copolymer component being a copolymer having a molecular weight above 20,000 and constituted by from 92–97 mol percent vinyl chloride with the balance of the monomers constituting said last-named copolymer being vinyl ester of fatty acid containing from 1–4 carbon atoms, the balance of said resin mixture being a condensation product of from .75–.95 mol of formaldehyde with 1 mol of a tetrafunctional bisphenol condensed in aqueous alkaline medium.

7. A primer as recited in claim 6 in which said condensation of said bisphenol with formaldehyde is effected in the presence of concentrated ammonia in amount sufficient to overcome the acidity of said formaldehyde.

8. A primer as recited in claim 7 in which said vinyl copolymer component contains at least 20% by weight based on the weight thereof of said vinyl copolymer having a molecular weight above 20,000.

9. A primer as recited in claim 7 in which said carboxyl-containing copolymer is a copolymer of vinyl chloride, vinyl acetate and a maleic derivative selected from the group consisting of maleic acid and maleic anhydride and the mol percentage of free carboxyl radical in said vinyl copolymer component is in the range of 0.2–0.7 mol percent.

10. A primer as recited in claim 9 in which said carboxyl-containing copolymer and said copolymer of molecular weight above 20,000 are present in approximately equal proportions by weight.

11. A metal base having adhered thereto a baked film of primer comprising a resin mixture consisting essentially of from 75–85% by weight of a vinyl copolymer component, at least 15% by weight based on the weight of said vinyl copolymer component being constituted by a copolymer of 67–91 mol percent vinyl halide, a carboxylic monomer selected from the group consisting of aliphatic α-β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being mono-olefinically unsaturated copolymerizable with vinyl halide and in which the sole reactive entity is the olefinic unsaturation thereof and said carboxyl-containing copolymer having a molecular weight in the range of from 6,000 to 20,000, any balance of said vinyl copolymer component being a copolymer having a molecular weight above 20,000 and constituted by from 92–97 mol percent vinyl halide with the balance of the monomers constituting said last-named copolymer being said mono-olefinically unsaturated monomer, the balance of said resin mixture being an alkaline-condensed condensation product of from .75–.95 mol of formaldehyde with 1 mol of an at least trifunctional bisphenol.

12. A coated metal base as recited in claim 11 in which a topcoat is adhered to said primer film, said topcoat comprising a fused layer of a polymer having a molecular weight above 20,000 and selected from the group consisting of polyvinyl chloride, copolymers of vinyl chloride with up to 10% by weight of vinyl acetate and copolymers of vinyl chloride with up to 10% by weight of vinylidene chloride.

13. A sheet of steel having adhered thereto a baked film of primer comprising a resin mixture consisting essentially of from 75–85% by weight of a vinyl copolymer component, at least 15% by weight based on the weight of said vinyl copolymer component being constituted by a copolymer of 67–91 mol percent vinyl halide, a carboxylic monomer selected from the group consisting of aliphatic α-β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being mono-olefinically unsaturated monomer copolymerizable with vinyl halide and in which the sole reactive entity is the olefinic unsaturation thereof and said carboxyl-containing copolymer having a molecular weight in the range of from 6,000 to 20,000, any balance of said vinyl copolymer component being a copolymer having a molecular weight above 20,000 and constituted by from 92–97 mol percent vinyl halide with the balance of the monomers constituting said last-named copolymer being said mono-olefinically unsaturated monomer, the balance of said resin mixture being an alkaline-condensed condensation product of from .75–.95 mol of formaldehyde with 1 mol of an at least trifunctional bisphenol.

14. A coated sheet of steel as recited in claim 13 in which a topcoat is adhered to said primer film, said topcoat comprising a fused layer of a polymer having a molecular weight above 20,000 and selected from the group consisting of polyvinyl chloride, copolymers of vinyl chloride with up to 10% by weight of vinyl acetate and copolymers of vinyl chloride with up to 10% by weight of vinylidene chloride.

15. A sheet of aluminum having adhered thereto a baked film of primer comprising a resin mixture consisting essentially of from 75–85% by weight of a vinyl copolymer component, at least 15% by weight based on the weight of said vinyl copolymer component being constituted by a copolymer of 67–91 mol percent vinyl halide, a carboxylic monomer selected from the group consisting of aliphatic α-β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being mono-olefinically unsaturated monomer copolymerizable with vinyl halide and in which the sole reactive entity is the olefinic unsaturation thereof and said carboxyl-containing copolymer having a molecular weight in the range of from 6,000 to 20,000, any balance of said vinyl copolymer component being a copolymer having a molecular weight above 20,000 and constituted by from 92–97 mol percent vinyl halide with the balance of the monomers constituting said last-named copolymer being said mono-olefinically unsaturated monomer, the balance of said resin mixture being an alkaline-condensed condensation product of from .75–.95 mol of formaldehyde with 1 mol of an at least trifunctional bisphenol.

16. A coated sheet of aluminum as recited in claim 15 in which a topcoat is adhered to said primer film, said topcoat comprising a fused layer of a polymer having a molecular weight above 20,000 and selected from the group consisting of polyvinyl chloride, copolymers of vinyl chloride with up to 10% by weight of vinyl acetate and copolymers of vinyl chloride with up to 10% by weight of vinylidene chloride.

17. A coated sheet of aluminum as recited in claim 15 in which said aluminum is protected with a coating selected from the group consisting of amorphous phosphate and amorphous chromate coatings.

18. A metal base having adhered thereto a baked film of primer comprising a resin mixture consisting essentially of from 75–85% by weight of a vinyl copolymer component, at least 15% by weight based on the weight of said vinyl copolymer component being constituted by a copolymer of 67–91 mol percent vinyl halide, a carboxylic monomer selected from the group consisting of aliphatic α,β-monoethylenically unsaturated carboxylic acids, carboxylic acid anhydrides and partial alkyl esters of said acids, said carboxylic monomer being present in said copolymer in an amount to provide from about 0.15 mol percent to about 5.0 mol percent of free carboxyl radical in said vinyl copolymer component, the balance of the monomers constituting said carboxyl-containing copolymer being mono-olefinically unsaturated monomer copolymerizable with vinyl halide and in which the sole reactive entity is the olefinic unsaturation thereof and said carboxyl-containing copolymer having a molecular weight in the range of from 6,000 to 20,000, any balance of said vinyl copolymer component being a copolymer having a molecular weight above 20,000 and constituted by from 92–97 mol percent vinyl halide with the balance of the monomers constituting said last-named copolymer being said mono-olefinically unsaturated monomer, the balance of said resin mixture being an alkaline-condensed condensation product of from .75–.95 mol of formaldehyde with 1 mol of an at least trifunctional bisphenol, said baked film of primer having a topcoat adhered thereto, said topcoat comprising a fused layer of fluid resin dispersion, said fluid resin dispersion comprising resin, plasticizer, and volatile liquid dispersant components, said components consisting of (1) solid thermoplastic polyvinyl resin having an average molecular weight in excess of 20,000 and made from vinyl chloride in major amount, (2) plasticizer for said resin, and (3) volatile liquid dispersant material consisting essentially of mixed aromatic alkyl substituted polynuclear hydrocarbons having a composite specific gravity of about one, a mixed aniline point of about 26° to about 30° C., and a distillation range of about 150° C. to about 450° C., the plasticizer component (2) constituting about 5% to about 25% of the combined weight of the resin and plasticizer components (1) and (2), and the volatile liquid dispersant component (3) constituting about 35% to about 55% of the total weight of components (1), (2), and (3), said composition having a viscosity in the range of about 30 seconds to about 300 seconds in No. 4 Ford cup at 80° F., being capable, when baked at 425° F. for 5 minutes, of releasing most of the said material (3) to the atmosphere.

19. A coated metal base as recited in claim 18 in which said dispersant component is characterized by having a series of substantially equal components by weight which have a series of respective boiling points increasing by substantially even increments, the range of distillation of said dispersant component extending over a span of at least substantially 193° C. between said upper and lower limits of distillation temperature.

20. A coated metal base as recited in claim 19 in which said topcoat is fused by baking at a temperature of at least 400° F.

References Cited in the file of this patent

UNITED STATES PATENTS

| | | |
|---|---|---|
| 2,324,078 | Gray et al. | July 13, 1943 |
| 2,328,057 | Coulter | Aug. 31, 1943 |
| 2,431,078 | Powell et al. | Nov. 18, 1947 |
| 2,497,045 | Killingsworth et al. | Feb. 7, 1950 |
| 2,550,232 | Donnell et al. | Apr. 24, 1951 |
| 2,654,719 | Schwenke | Oct. 6, 1953 |
| 2,793,141 | Barr | May 21, 1957 |

OTHER REFERENCES

Ellis: Synthetic Resins and Thin Plastics, published by Chemical Catalog Co., Inc., 1923 (page 125).